(12) United States Patent
Lee et al.

(10) Patent No.: US 11,222,560 B2
(45) Date of Patent: Jan. 11, 2022

(54) DISPLAY DEVICE

(71) Applicant: Samsung Display Co., Ltd., Yongin-Si (KR)

(72) Inventors: Hyun Wook Lee, Asan-si (KR); Jae Ho Choi, Asan-si (KR); Seung Rae Kim, Cheonan-si (KR); Jae Min Seong, Suwon-si (KR); Min cheol Chae, Asan-si (KR)

(73) Assignee: Samsung Display Co., Ltd.

( * ) Notice: Subject to any disclaimer, the term of this patent is extended or adjusted under 35 U.S.C. 154(b) by 311 days.

(21) Appl. No.: 16/230,631

(22) Filed: Dec. 21, 2018

(65) Prior Publication Data

US 2020/0020260 A1 Jan. 16, 2020

(30) Foreign Application Priority Data

Jul. 13, 2018 (KR) ........................ 10-2018-0081629

(51) Int. Cl.
  *G02F 1/13* (2006.01)
  *G09G 3/00* (2006.01)
  *G02F 1/1335* (2006.01)
  *G02F 1/1333* (2006.01)

(52) U.S. Cl.
  CPC ....... *G09G 3/006* (2013.01); *G02F 1/133512* (2013.01); *G02F 1/133514* (2013.01); *G02F 1/133374* (2021.01)

(58) Field of Classification Search
  CPC ...... G09G 3/006; G09G 3/32; G09G 2330/12; G09G 2300/0426; G01R 31/2635; G02F 1/133512; G02F 1/133514; G02F 2001/133374; G02F 1/13; G02F 1/133; G02F 1/136; G02F 2001/133; G02F 2001/136

USPC ........... 324/760.01–760.02, 192; 345/84–90; 349/104–106
See application file for complete search history.

(56) References Cited

U.S. PATENT DOCUMENTS

| 2008/0186271 | A1* | 8/2008 | Yokoyama | ........ G02F 1/136213 345/100 |
| 2011/0133636 | A1* | 6/2011 | Matsuo | ................... H01L 51/56 313/504 |
| 2017/0236879 | A1* | 8/2017 | Kubota | .............. H01L 51/0031 257/40 |

FOREIGN PATENT DOCUMENTS

| EP | 2312558 A1 | 4/2011 |
| KR | 10-2007-0082106 A | 8/2007 |
| KR | 10-2008-0062917 A | 7/2008 |
| KR | 10-2011-0050440 A | 5/2011 |
| KR | 10-2016-0082783 A | 7/2016 |

(Continued)

*Primary Examiner* — Jermele M Hollington
*Assistant Examiner* — Courtney G McDonnough
(74) *Attorney, Agent, or Firm* — Innovation Counsel LLP

(57) ABSTRACT

An exemplary embodiment provides a display device including: a display part configured to include a display part color filter; and a peripheral part disposed at the upper side of the display part and including an inspection pattern for checking an alignment of the display part color filter. The inspection pattern may include a plurality of color filters having colors and reference patterns disposed at at least one side of the plurality of color filters. A number of the plurality of color filters of each color corresponds to a number of shots of a division exposure process. Adjacent color filters among the plurality of color filters may be disposed at different heights.

19 Claims, 14 Drawing Sheets

(56) References Cited

FOREIGN PATENT DOCUMENTS

KR   10-2017-0060410 A   6/2017

* cited by examiner

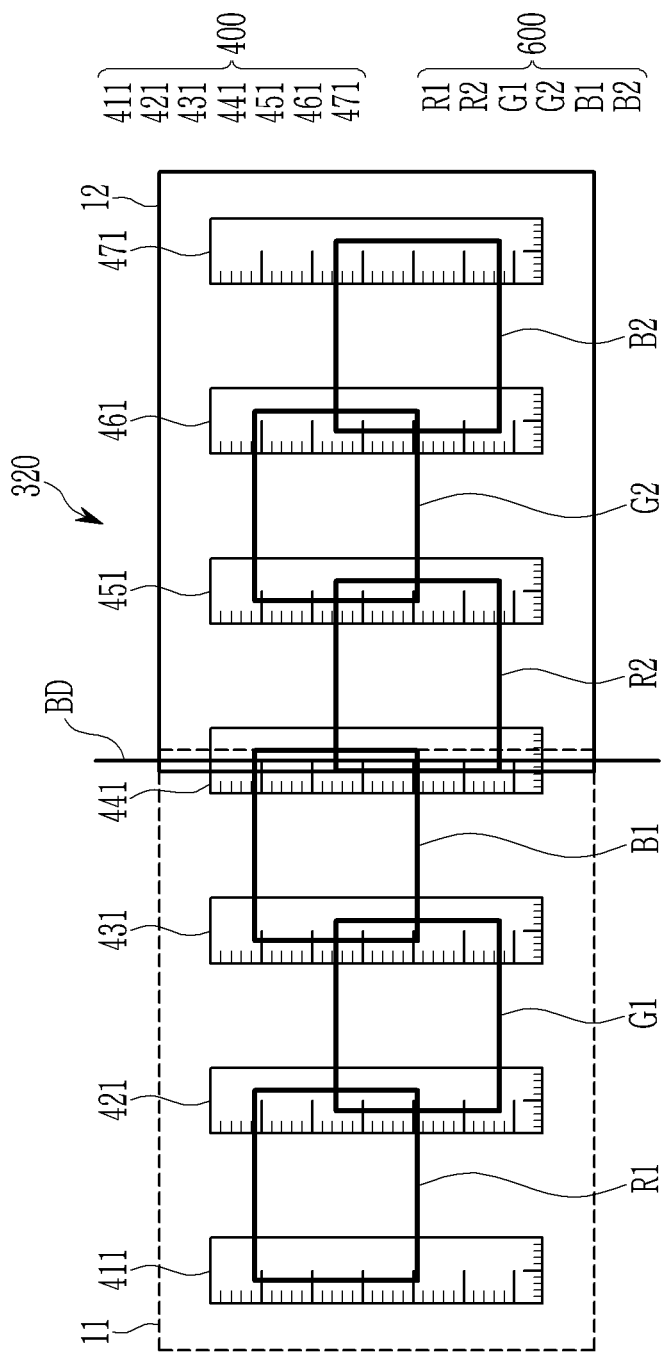

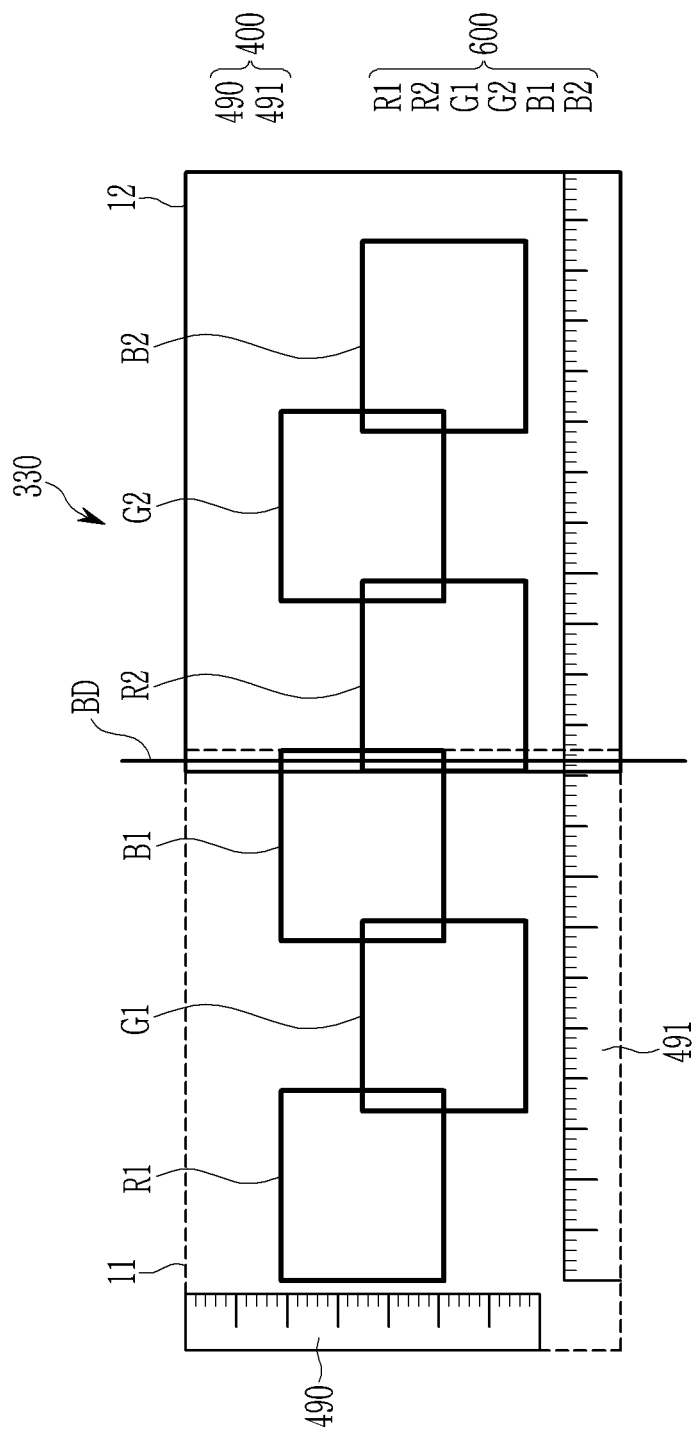

DISPLAY DEVICE

CROSS-REFERENCE TO RELATED APPLICATION

This application claims priority to and the benefit of Korean Patent Application No. 10-2018-0081629 filed in the Korean Intellectual Property Office on Jul. 13, 2018, the entire contents of which are incorporated herein by reference.

BACKGROUND

(a) Field

The present application relates to a display device, and more particularly, to a display device that includes an inspection pattern capable of determining misalignment of patterns during a division exposure process.

(b) Description of the Related Art

As a display device, a liquid crystal display and an organic light emitting diode (OLED) display are used.

The display device may include a plurality of thin film layers such as a substrate, a gate insulating layer stacked on the substrate, a data wire, a source electrode, a drain electrode, a light blocking layer (black matrix), a color filter, a passivation layer, and the like.

In order to form the plurality of thin film layers, a conductive layer deposition process, a photoresist (PR) coating process, a photoresist pattern formation process by selective exposure and development of a photoresist using a mask, and a photolithography process of etching a conductive layer by using a photoresist pattern as a mask are used.

On the other hand, as a size of a display panel increases, a size of a mask that can be used in exposure equipment is limited in manufacturing a display device including the display panel. In order to overcome this problem, a division exposure method has been used in which a thin film pattern is formed by exposing a large-sized substrate with a single mask several times in the exposure process.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a display device that may easily measure a misalignment of a pattern and determine a stitch defect occurring at a shot boundary in a divided exposure process.

An exemplary embodiment provides a display device including: a display part configured to include a display part color filter; and a peripheral part disposed at the upper side of the display part and including an inspection pattern for checking an alignment of the display part color filter. The inspection pattern may include a plurality of color filters having colors and reference patterns disposed at at least one side of the plurality of color filters. A number of the plurality of color filters of each color corresponds to a number of shots of a division exposure process. Adjacent color filters among the plurality of color filters may be disposed at different heights.

Odd-numbered color filters among the plurality of color filters may be disposed at the same height, and even-numbered color filters among the plurality of color filters may be disposed at the same height.

The odd-numbered color filters may be disposed at a higher position than the even-numbered color filters.

The odd-numbered color filters may be disposed at a lower position than the even-numbered color filters.

The inspection pattern may be disposed at a boundary part of the shots existing in at least one peripheral part.

An interval between the plurality of color filters may be the same as an interval between the display part color filter.

An interval between the reference patterns may be the same as an interval between reference patterns disposed in the display part.

The inspection pattern may be disposed at the boundary part of the shots, and one of the reference patterns and at least one of the color filters may be adjacent to the boundary part of the shots.

The reference patterns may be spaced apart in a row direction at predetermined intervals.

A scale in which marks are disposed at predetermined intervals may be disposed on the reference patterns along at least one side of the reference patterns.

The inspection pattern may include two separated inspection patterns, and the reference patterns closest to the boundary part of the shots among the two separated inspection patterns may be disposed to have a predetermined horizontal distance from the boundary part of the shots.

The reference patterns may be spaced apart in a row direction at predetermined intervals, and an interval between the reference patterns closest to the boundary part of the shots among the predetermined intervals may be different from the remaining predetermined intervals.

A scale with predetermined interval marks may be disposed on the reference patterns along at least one side of the reference patterns.

The reference patterns may be disposed along at least one side of the inspection pattern, and a scale with predetermined interval marks may be disposed on the reference patterns.

A color filter of the plurality of color filters may partially overlap another color filter of the plurality of color filters adjacent thereto, and a vertical length of an overlapped portion of the adjacent color filters may be smaller than a vertical length of the plurality of color filters.

The reference patterns may have a shape of a pad having a predetermined horizontal length and a predetermined vertical length, and the vertical length of the reference patterns may be longer than a vertical length of the plurality of color filters.

The plurality of color filters of the inspection pattern may be disposed on an upper substrate, a light blocking layer may be disposed on the upper substrate, and the reference patterns may be made of the same material as the light blocking layer.

The plurality of color filters of the inspection pattern may be disposed on a lower substrate, a light blocking layer may be disposed on the lower substrate, and the reference patterns may be made of the same material as the light blocking layer or a data wire disposed on the lower substrate.

The plurality of color filters of the inspection pattern may be disposed on a lower substrate, a light blocking layer may be disposed on an upper substrate, and the reference patterns may be made of the same material as a data wire disposed on the lower substrate.

The plurality of color filters of the inspection pattern may be disposed on a lower substrate, a light blocking layer may be disposed on a lower substrate, an array layer in which a thin film transistor is included may be stacked on the plurality of color filters, and the reference patterns may be made of the same material as the light blocking layer.

According to the exemplary embodiments, it is possible to facilitate measurement of misalignment of patterns such as an overlay deviation and a line width deviation between the patterns through an inspection pattern positioned at a shot boundary, and to correct the deviation based on the deviation measurement such that a stitch defect may be prevented from being viewed.

BRIEF DESCRIPTION OF THE DRAWINGS

FIG. 13 and FIG. 14 illustrate an enlarged view of a modification from the shape of the inspection pattern of FIG. 2, respectively.

DETAILED DESCRIPTION OF THE EMBODIMENTS

Figure 1:
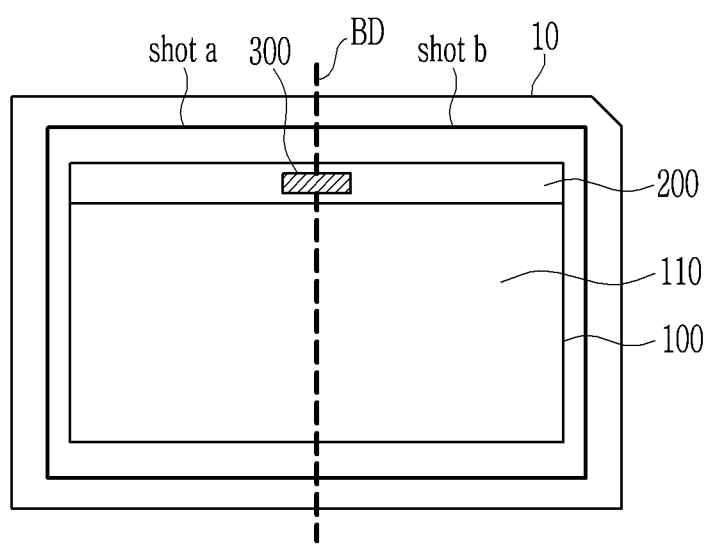
FIG. 1 illustrates a layout view of a display device according to an exemplary embodiment.

The inventive concept will be described more fully hereinafter with reference to the accompanying drawings, in which exemplary embodiments are shown. As those skilled in the art would realize, the described embodiments may be modified in various different ways, all without departing from the spirit or scope of the present disclosure.

Parts that are irrelevant to the description will be omitted to clearly describe the present disclosure, and like reference numerals designate like elements throughout the specification.

Further, in the drawings, the size and thickness of each element are arbitrarily illustrated for ease of description, and the present disclosure is not necessarily limited to those illustrated in the drawings. In the drawings, the thicknesses of layers, films, panels, regions, etc., are exaggerated for clarity. In the drawings, for ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or above the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

Hereinafter, a display device according to an exemplary embodiment will be described with reference to FIG. 1 to FIG. 3.

FIG. 1 illustrates a layout view of a display device according to an exemplary embodiment. FIG. 2 illustrates an enlarged view of a shape of an inspection pattern 300 of FIG. 1. FIG. 3 illustrates a schematic diagram for explaining a shape of the inspection pattern 300 of FIG. 1 or FIG. 2.

Referring to FIG. 1, a display device according to an exemplary embodiment includes a display panel 100, and is disposed in part of a mother substrate 10. A plurality of display panels 100 are disposed in the mother substrate 10, and each display panel 100 is formed by cutting the mother substrate 10 later.

The display panel 100, when viewed in a plan view, includes a display part 110 capable of displaying an image and a peripheral part 200 disposed around the display part 110. The peripheral part 200 includes the inspection pattern 300 that may determine misalignment of patterns during division-exposing in a manufacturing process in accordance with one embodiment.

The display part 110 includes a plurality of pixels (not shown), and a plurality of display signal lines (not shown) connected to the pixels to transmit driving signals. The inspection pattern 300 disposed in the peripheral part 200 is formed to be adjacent to a shot boundary part BD. The shot boundary part BD is shown in thick dotted lines.

The display panel 100 is divided into a plurality of regions to be manufactured by a division exposure process of exposing several times with a single mask. Herein, performing the exposure once with a mask is called a shot. Specifically, as shown in FIG. 1, a shot a of irradiating light on an upper portion of a mask and exposing it after disposing of the mask on an upper portion corresponding to an exposure area of the display panel 100 is performed, and then a shot b is performed by moving the mother board 10 supporting the display panel 100 or by moving the mask. Shot a is the thick solid line portion on the left side of the shot boundary part BD and shot b is the thick solid line portion on the right side of the shot boundary part BD. The mask used for shot a and shot b may be the same mask.

In the division exposure method, misalignment may occur, however, in the present embodiment, the inspection pattern 300 is formed to easily check the misalignment.

The inspection pattern 300 capable of easily measuring the misalignment of the pattern at the boundary part will be described with reference to FIG. 2 and further described with reference to FIG. 3.

Figure 2:
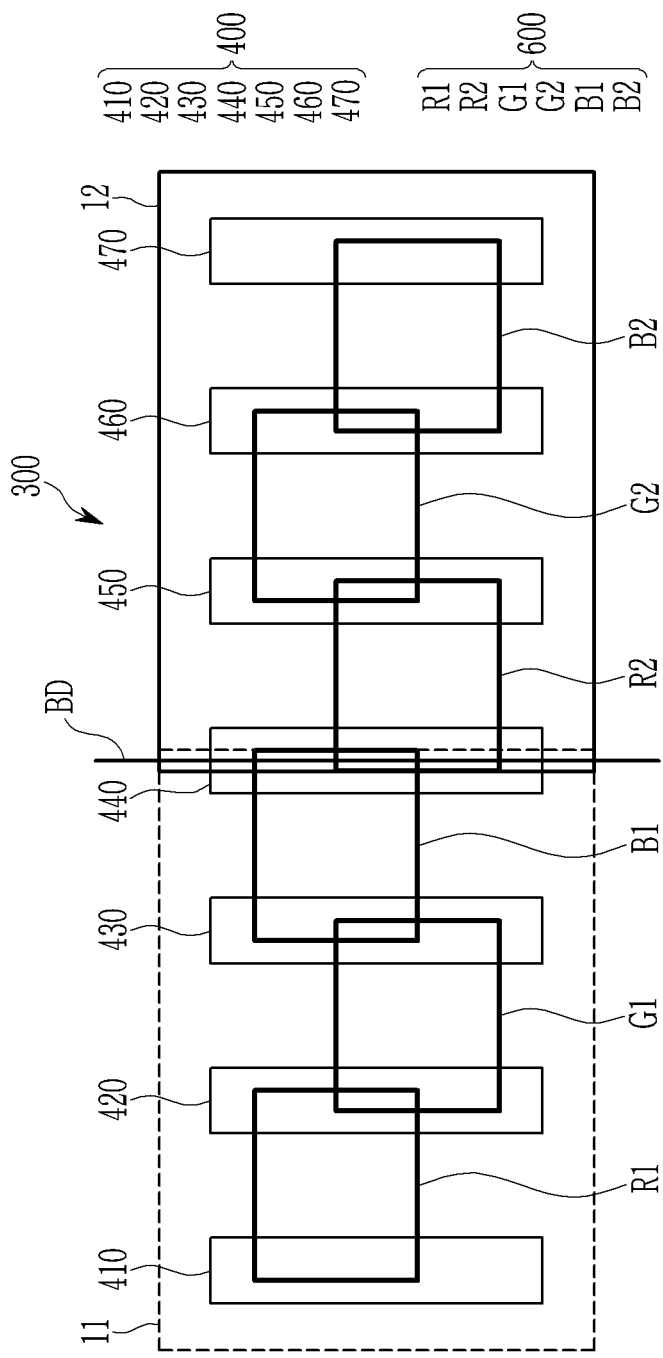
FIG. 2 illustrates an enlarged view of a shape of an inspection pattern of FIG. 1.

Referring to FIG. 2, the inspection pattern 300 is formed to be adjacent to the shot boundary part BD of the peripheral part 200, and is formed with a plurality of color filters 600 and a plurality of reference patterns 400.

The plurality of color filters 600 include red color filters R1 and R2, green color filters G1 and G2, and blue color filters B1 and B2, and each color filter 600 has a predetermined horizontal length and a predetermined vertical length. The color filters 600 of each color are formed as a number corresponding to a number of shots exposed by the mask. In other words, each of shot a and shot b may comprise one red color filter, one green color filter and one blue color filter.

And a width of each color filter 600 may be equal to that of a color filter, sometimes called a display part color filter, formed in the display part. The color filters 600 and the display part color filter may be disposed at the same vertical line.

A width of an aperture of the color filters 600 may be equal to that of the display part color filter formed in the display part. The aperture of the color filters 600 may be a portion exposed without being obscured by the reference patterns 400. In other words, the width of an aperture of the color filters 600 may be the same as the interval between the reference patterns 400.

Hereinafter, the red color filter of the shot a is referred to as a first color filter R1, the green color filter of the shot a is referred to as a second color filter G1, the blue color filter of the shot a is referred to as a third color filter B1, the red color filter of the shot b is referred to as a fourth color filter R2, the green color filter of the shot b is referred to as a fifth color filter G2, and the blue color filter of the shot b is referred to as a sixth color filter B2.

The plurality of reference patterns 400 may be spaced apart from each other in a row direction at predetermined intervals, and may have a form of a pad having a predetermined horizontal length and a predetermined vertical length. The plurality of color filters 600 are formed between the reference patterns 400. The number of the reference patterns 400 is one more than the number of the plurality of color filters 600. That is, when n color filters 600 are formed, (n+1) reference patterns 400 may be formed.

The vertical length of the reference patterns 400 may be formed to be longer than that of the color filters 600. The interval between the reference patterns 400 may correspond to that of a reference pattern, sometimes called a display part reference pattern, formed in the display part. The reference patterns 400 and the display part reference pattern may be disposed at the same vertical line. The interval between the reference patterns 400 may be the same as the width of the aperture of the color filters 600 and display part color filter.

In some exemplary embodiments, it is possible to form the reference patterns 400 shorter than the length of the color filters 600 while forming the reference patterns 400 to have a necessary length at a required position. In addition, the reference patterns 400 may be formed at one layer or may be formed at different layers that are vertically separated such that the reference patterns 400 of each layer are disposed in one column.

Hereinafter, an arrangement of the color filters 600 according to the present exemplary embodiment will be described in detail.

The color filters 600 adjacent to the inspection pattern 300 according to the present exemplary embodiment are respectively formed at different positions in a longitudinal direction. That is, odd-numbered color filters R1, B1, and G2 from a left side are formed at higher positions than even-numbered color filters G1, R2, and B2 from the left side. This is so that the position of each color filter 600 may be clearly confirmed by preventing the adjacent color filters 600 from being completely overlapped. In some exemplary embodiments, the odd-numbered color filters R1, B1, and G2 from the left side may be formed at lower positions than the even-numbered color filters G1, R2, and B2 from the left side.

In other words, the first color filter R1, the third color filter B1, and the fifth color filter G2 may be formed at the same position in the longitudinal direction. In addition, the second color filter G1, the fourth color filter R2, and the sixth color filter B2 may be formed at the same position in the longitudinal direction, and they may be formed at a different position from the first color filter R1, the third color filter B1, and the fifth color filter G2.

Accordingly, the color filters that are disposed in different shots while displaying the same color are formed at different positions in the longitudinal direction. The first color filter R1 may be formed at a relatively higher position compared to the fourth color filter R2. In this case, the second color filter G1 may be formed at a relatively lower position compared to the fifth color filter G2. At the same time, the third color filter B1 may be formed at a relatively higher position compared to the sixth color filter B2. Thus, the plurality of color filters 600 in the inspection pattern 300 are disposed so as to have a two-row-arrangement in up and down directions with overlapping portions.

In some exemplary embodiments, when four types of color filters 600 are used, the adjacent color filters 600 may be in a different row, and the color filters 600 of the same color may be disposed at the same height. In some exemplary embodiments, there may be three or more heights where the color filters 600 are disposed. In the exemplary embodiment using the color filters 600 of three colors, the color filters 600 of the respective colors may be disposed at the same height.

In addition, the color filters 600 are formed so that predetermined portions thereof overlap each other at portions at which the color filters 600 are adjacent to each other. That is, a part of a right side of the first color filter R1 overlaps a part of a left side of the second color filter G1, a part of a right side of the second color filter G1 overlaps a part of a left side of the third color filter B1, and a part of a right side of the third color filter B1 overlaps a part of a left side of the fourth color filter R2. A part of a right side of the fourth color filter R2 overlaps a part of a left side of the fifth color filter G2, and a part of a right side of the fifth color filter G2 overlaps a part of a left side of the sixth color filter B2. In this case, a vertical length of an overlapped part between the adjacent color filters 600 is smaller than a vertical length of the color filter 600. At least some of opposite sides of the color filter 600 do not overlap the adjacent color filter 600. As a result, an interval between the color filter 600 and the reference pattern 400 may be accurately measured.

Hereinafter, an arrangement of the reference pattern 400 and a relationship between the color filter 600 and the reference pattern 400 will be described in detail.

In the inspection pattern 300 according to the present exemplary embodiment, the plurality of reference patterns 400 are formed at opposite sides of the plurality of color filters 600, and are spaced apart from each other in the row direction at predetermined intervals. The interval between the reference patterns 400 may be equal to the width of the aperture of the color filters 600, which may be the same as that of the display part color filter formed in the display part of the pixel.

Remaining reference patterns 420, 430, 440, 450, and 460 excluding for the first and seventh reference patterns 410 and 470 formed at outermost sides are formed to overlap two color filters 600 disposed at respective left and right sides of the reference patterns 420, 430, 440, 450, and 460. That is, one reference pattern 420, 430, 440, 450, or 460 is formed in an area corresponding to the overlapped part between the color filters 600.

In other words, the first reference pattern 410 overlaps the left side of the first color filter R1. The second reference pattern 420 overlaps the right side of the first color filter R1 and the left side of the second color filter G1. The third reference pattern 430 overlaps the right side of the second color filter G1 and the left side of the third color filter B1. The fourth reference pattern 440 overlaps the right side of the third color filter B1 and the left side of the fourth color filter R2. The fifth reference pattern 450 overlaps the right side of the fourth color filter R2 and the left side of the fifth color filter G2. The sixth reference pattern 460 overlaps the right side of the fifth color filter G2 and the left side of the sixth color filter B2. The seventh reference pattern 470 overlaps the right side of the sixth color filter B2.

Hereinafter, an order in which the inspection pattern 300 is formed through the divided exposure process will be described.

First, after the mask for the color filter is disposed in the area of the shot a in a state in which the reference patterns 400 are arranged, the exposure and development are performed to form the first color filter R1 between the first and second reference patterns 410 and 420. Next, the mask for the color filter is disposed in the area of the shot b, and then the exposure and development are performed to form the fourth color filter R2 between the fourth and fifth reference patterns 440 and 450. In this case, two color filters R1 and R2 are formed at different heights.

Next, the mask for the color filter is disposed in the area of the shot a, and then the exposure and development are performed to form the second color filter G1 between the second and third reference patterns 420 and 430. Subsequently, the mask for the color filter is disposed in the area of the shot b, and then the exposure and development are performed to form the fifth color filter G2 between the fifth and sixth reference patterns 450 and 460. In this case, the two color filters G1 and G2 are formed at different heights.

Next, the mask for the color filter is disposed in the area of the shot a, and then the exposure and development are performed to form the third color filter B1 between the third and fourth reference patterns 430 and 440. Subsequently, the mask for the color filter is disposed in the area of the shot b, and then the exposure and development are performed to form the sixth color filter B2 between the sixth and seventh reference patterns 460 and 470. In this case, two color filters B1 and B2 are formed at different heights.

Accordingly, two color filters B1 and R2 on the shot boundary part BD are formed at different heights, and predetermined parts thereof overlap the reference pattern 440 disposed at the shot boundary part BD.

In the shot a and the shot b, a plurality of exposure processes of forming the plurality of color filters 600 may be processes of moving and exposing the pattern mask or the mother substrate 10 by using the same pattern mask.

The inspection pattern 300 according to the present exemplary embodiment includes three color filters R1, G1, and B1 in the area of the shot a, and includes three color filters R2, G2, and B2 in the area of the shot b. Since the reference pattern 400 overlaps opposite sides of each of the color filters 600, it includes a total of seven reference patterns 410 to 470.

Hereinafter, a method of determining the misalignment of the pattern will be described in detail based on the inspection pattern 300 of FIG. 2 with reference to FIG. 3.

Figure 3:
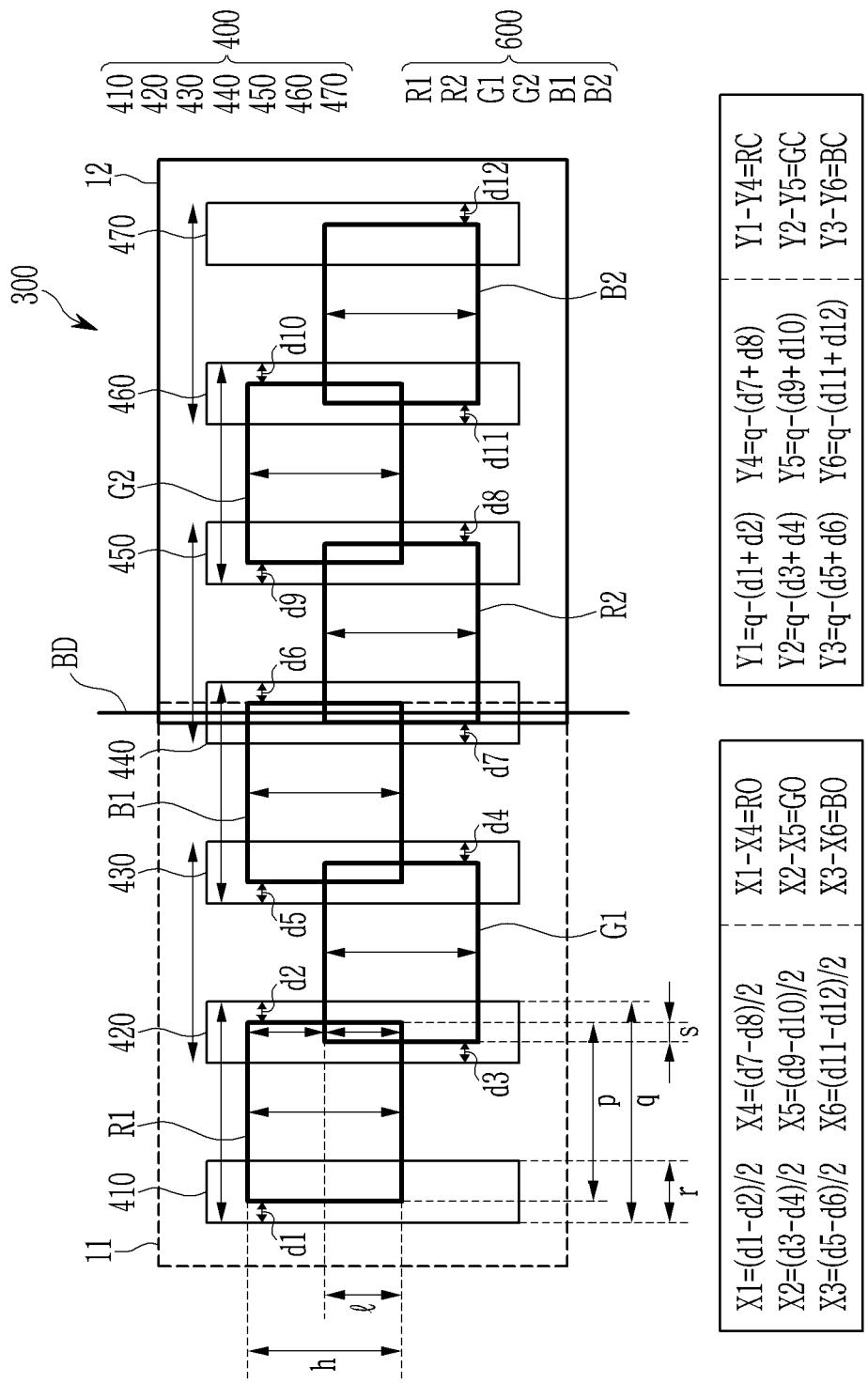
FIG. 3 illustrates a schematic diagram for explaining a shape of an inspection pattern of FIG. 1 or FIG. 2.

Referring to FIG. 3, the inspection pattern 300 is formed to be adjacent to the shot boundary part BD of the peripheral part 200, and includes the plurality of color filters 600 and the plurality of reference patterns 400.

To describe the exemplary embodiment, as shown in FIG. 3, a line width, sometime called the width, of the color filter 600 is referred to as a first width p, a vertical length of the color filter 600 is referred to as a first length h, a width of the overlapped part between the color filters 600 is referred to as a fourth width s, and a vertical length of the overlapped part between the color filters 600 is referred to as a second length l. In addition, a distance between left and right sides of each the color filter 600 and a distance between left and right sides of the reference pattern 400 formed at opposite sides of each the color filter 600 are respectively referred to as first to twelfth intervals d1, d2, d3, d4, d5, d6, d7, d8, d9, d10, d11, and d12. A distance between a left side of a left reference pattern 400 of the adjacent reference patterns 400 and a right side of a right reference pattern 400 thereof is referred to as a second width q, and a width of the reference pattern 400 is referred to as a third width r.

It is possible to measure whether or not the color filter pattern is misaligned by using the inspection pattern 300 according to the exemplary embodiment. In this case, the plurality of color filters 600 included in the inspection pattern 300 disposed in the peripheral part 200 are patterned on the same line as the color filter formed on the display part 110 disposed below the peripheral part 200, thus it is possible to measure an overlay deviation of the color filters and a line width deviation of the color filters without damaging the display part 110.

Now, a method of measuring an overlay deviation of the red color filters R1 and R2 by using the first interval d1, the second interval d2, the seventh interval d7, and the eighth interval d8 will be described with reference to FIG. 3 and Table 1.

TABLE 1

| X1 = (d1 − d2)/2 | X4 = (d7 − d8)/2 | X1 − X4 = RO |
| X2 = (d3 − d4)/2 | X5 = (d9 − d10)/2 | X2 − X5 = GO |
| X3 = (d5 − d6)/2 | X6 = (d11 − d12)/2 | X3 − X6 = BO |

The first interval d1 is a distance between the left side of the first color filter R1 and the left side of the first reference pattern 410 formed at the left side of the first color filter R1. The second interval d2 is a distance between the right side of the first color filter R1 and the right side of the second reference pattern 420 formed at the right side of the first color filter R1. The first overlay X1, which is the overlay of the first color filter R1, is shown in Table 1.

Similarly, the seventh interval d7 is a distance between the left side of the fourth color filter R2 and the left side of the fourth reference pattern 440 formed at the left side of the fourth color filter R2. The eighth interval d8 is a distance between the right side of the fourth color filter R2 and the right side of the fifth reference pattern 450 formed at the right side of the fourth color filter R2. The fourth overlay X4 corresponding to the overlay of the fourth color filter R4 is shown in Table 1.

A difference between the first overlay X1 and the fourth overlay X4 is referred to as a first deviation RO which is an overlay deviation of the red color filters R1 and R2 of the shot a and the shot b, and the first deviation RO is shown in Table 1.

In this case, when the first deviation RO is 0 (RO=0), the overlay deviations of the red color filters R1 and R2 are the same, thus the stitch defect may not be viewed. However, when the first deviation RO is a positive or negative value other than 0 (RO≠0), since there is an overlay deviation of the red color filters R1 and R2 of the respective shots, the stitch defect due to the overlay deviation between the color filters 600 may be viewed at the shot boundary part BD.

The method of measuring the overlay deviation of the color filter 600 will be explained more easily with reference to exemplary numerical values.

For example, assuming that the first interval d1 is 1 (d1=1) and the second interval d2 is 3 (d2=3), the first overlay X1 (=(d1−d2)/2) is −1. At the same time, when the overlay value of the fourth color filter R2 is +1 (X4=+1), the first deviation (RO=X1−X4) is −2. That is, the overlay X1 of the first color filter R1 is shifted to the left by one and the overlay X4 of the fourth color filter R2 is shifted to the right by one to be exposed in a state in which an error in the corresponding pattern alignment occurs, thus the stitch defect is viewed.

Therefore, for example, based on the measurements in the inspection process, it is possible to remove the first deviation RO (RO=0) by performing a correction of shifting the first overlay X1 by one (+1) to the right and of shifting the fourth overlay X4 by one (−1) to the left. That is, the stitch defect at the shot boundary part BD may be easily improved.

Similarly, the second deviation GO, which is the overlay deviation of the green color filters G1 and G2 between the shot a and the shot b, and the third deviation BO, which is the overlay deviation of the blue color filter B1 and B2 between the shot a and the shot b, may also be measured as shown in Table 1 with the same principle as described above.

The omitted contents correspond to those according to the aforementioned method of measuring the first deviation RO.

Now, a method of measuring a line width deviation of the red color filters R1 and R2 by using the first interval d1, the second interval d2, the seventh interval d7, and the eighth interval d8 will be described with reference to FIG. 3 and Table 2. For better comprehension and ease of description, the description for the same reference numerals follows the description of the method of measuring the overlay deviation described above.

TABLE 2

| Y1 = q − (d1 + d2) | Y4 = q − (d7 + d8) | Y1 − Y4 = RC |
|---|---|---|
| Y2 = q − (d3 + d4) | Y5 = q − (d9 + d10) | Y2 − Y5 = GC |
| Y3 = q − (d5 + d6) | Y6 = q − (d11 + d12) | Y3 − Y6 = BC |

According to the second width q, the first interval d1, and the second interval d2 described above, a first line width Y1, which is the line width of the first color filter R1, is shown in Table 2.

Similarly, based on the second width q, the seventh interval d7, and the eighth interval d8, a fourth line width Y4, which is the line width of the fourth color filter R2, is shown in Table 2.

A difference between the first line width Y1 and the fourth line width Y4 is referred to as a fourth deviation RC, which is a line width deviation of the red color filters R1 and R2 of the shot a and the shot b, and the fourth deviation RC is shown in Table 2.

In this case, when the fourth deviation RC is 0 (RC=0), the line width deviations of the red color filters R1 and R2 are the same, thus the stitch defect may not be viewed. However, when the fourth deviation RC is a positive or negative value other than 0 (RO≠0), since there is a line width deviation of the red color filters R1 and R2 of the respective shots, the stitch defect due to the line width deviation between the color filters 600 may be viewed at the shot boundary part BD.

The method of measuring the deviation of the line width of the color filter 600 will be explained more easily with reference to exemplary numerical values.

For example, assuming that the second width q is 10 (q=10), the first interval d1 is 1 (d1=1), and the second interval d2 is 3 (d2=3), the first line width Y1=(q−(d1+d2)) is +6. At the same time, when the fourth line width Y4 is +4 (Y4=+4), the fourth deviation RC=(Y1−Y4) is +2. That is, because of the deviation of the line widths of the red color filters R1 and R2 of respective shots that are adjacent to each other at the shot boundary part BD, the exposure process is performed in a state in which an error in the corresponding pattern alignment occurs, thus the stitch defect is viewed.

Therefore, based on the measurements in the inspection process, it is possible to remove the fourth deviation RC (RC=0) by performing a correction of the line width. In other words, it is possible to allow the line widths Y1 and Y4 of the red color filters R1 and R2 of the adjacent two shots to be equal. In this case, the correction of the line width may be adjusted by an exposure gap or an exposure amount. Accordingly, the stitch defect at the shot boundary part BD may be easily improved.

Similarly, a fifth deviation GC, which is the line width deviation of the green color filters G1 and G2 between the shot a and the shot b, and a sixth deviation BC, which the line width deviation of the blue color filters B1 and B2 between the shot a and the shot b, may also be measured as shown in Table 2 with the same principle as described above.

In FIG. 2 and FIG. 3, since the adjacent color filters 600 are formed at different heights, the first length his longer than the second length l (h>l). The first length h may be about 100 μm, and the second length l may suitably be about half of the first length h and therefore about 50 μm. The first width p may be 50 to 60 μm, and the second width q is substantially similar to a size of a typical pixel and therefore may be 70 to 80 μm. The third width r may be 3 to 12 μm. In this case, the first length h and the second width q may generally be values set by design.

In addition, the fourth width s is also known by measuring the first to twelfth intervals d1 to d12 and the third width r. For example, when the measured values of the second interval d2, the third interval d3, and the third width r are obtained, it is possible to know the width s of the overlapped part of the first color filter R1 and the second color filter G1 though Equation 1.

$$s = r - (d2 + d3)$$ [Equation 1]

In this case, the fourth width s may be different for respective overlapped parts of the adjacent color filters 600.

In FIG. 2 and FIG. 3, it has been exemplarily described that the inspection pattern 300 according to the exemplary embodiment includes a total of six color filters 600 formed as three on each of the right and left shots, and a total of seven reference patterns 410 to 470 formed at opposite sides of each the color filter 600 and partially overlapping opposite sides of each the color filter 600. However, the embodiments are not limited to the number of the color filters 600 and the reference patterns 400.

In addition, the inspection pattern 300 according to the exemplary embodiment has been described in the order from the red color filter R1 of the shot a to the blue color filter B2 of the shot b, but the embodiments are not limited thereto.

Figure 4:
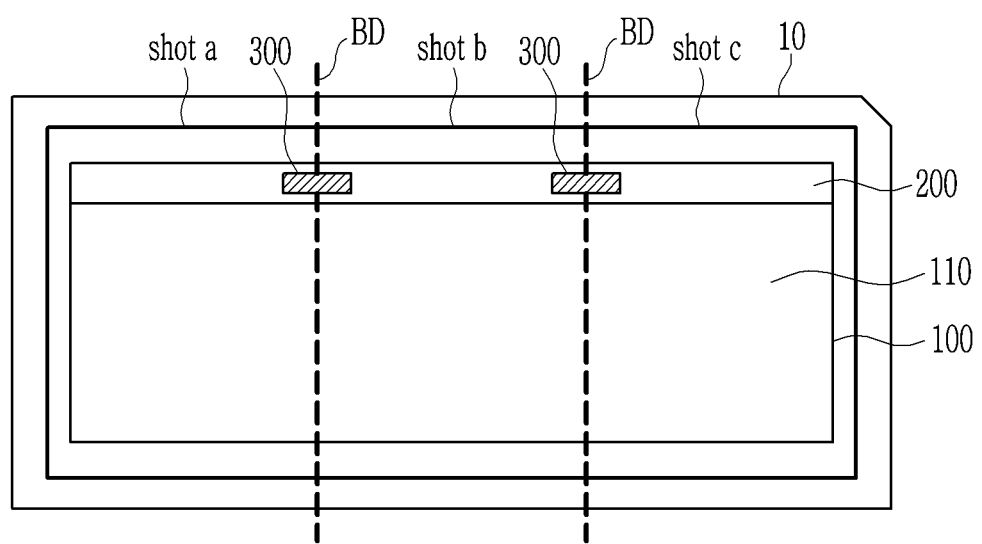
FIG. 4 illustrates a layout view of a display device in which the number of shots is increased as compared to FIG. 1.

FIG. 4 illustrates a layout view of a display device in which the number of shots is increased in FIG. 1, and illustrates an exemplary variation of FIG. 1.

Referring to FIG. 4, the display panel 100 manufactured by three-shot division exposure processes in which the shot a and the shot b shown in FIG. 1 are performed and a shot c is further performed, is shown. Specifically, the shot b is performed, and then the shot c is performed by moving the mother substrate 10 supporting the display panel 100 or by moving the mask.

As described in FIG. 1, since the inspection pattern 300 is formed at the shot boundary part BD, the inspection pattern 300 of the display panel 100 manufactured by the three-shot division exposure processes as in the present exemplary embodiment may be formed to be adjacent to two boundary parts BD, which are the boundary part of the shot a and the shot b and the boundary part of the shot b and the shot c.

The display panel 100 manufactured by the division exposure process including the two-shot or three-shot division exposure processes has been exemplarily described, but the embodiments are not limited to the number of the shots of the division exposure process.

Hereinafter, a display device according to another exemplary embodiment will be described with reference to FIG. 5 to FIG. 7.

Parts that are different from the exemplary embodiment of FIG. 1 to FIG. 3 will be described, and parts that are not described follow the exemplary embodiment described above. For better comprehension and ease of description, the constituent elements of another exemplary embodiment that are the same as the above-described exemplary embodiment will have the same reference numerals.

Figure 5:
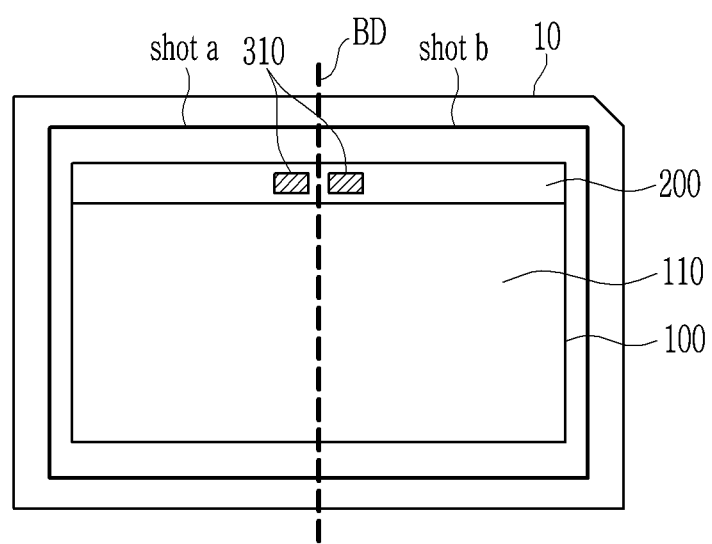
FIG. 5 illustrates a layout view of a display device according to an exemplary embodiment.

FIG. 5 illustrates a layout view of a display device according to an exemplary embodiment. FIG. 6 illustrates an enlarged view of a shape of an inspection pattern 310 of FIG. 5. FIG. 7 illustrates a schematic diagram for explaining a shape of the inspection pattern 310 of FIG. 5 or FIG. 6.

Referring to FIG. 5, the peripheral part 200 includes the inspection pattern 310 formed at the shot boundary part BD. However, in this case, although the inspection pattern 310 is formed at the shot boundary part BD, it does not overlap the boundary part BD. There is a difference from the inspection pattern 300 of FIG. 2 and FIG. 3 in that the shot a and the shot b of the inspection pattern 310 are spaced apart from each other by a predetermined horizontal interval with the boundary part BD therebetween.

The inspection pattern 310 capable of easily measuring the misalignment of the pattern at the boundary part BD will be described with reference to FIG. 6 and further described with reference to FIG. 7.

Figure 6:
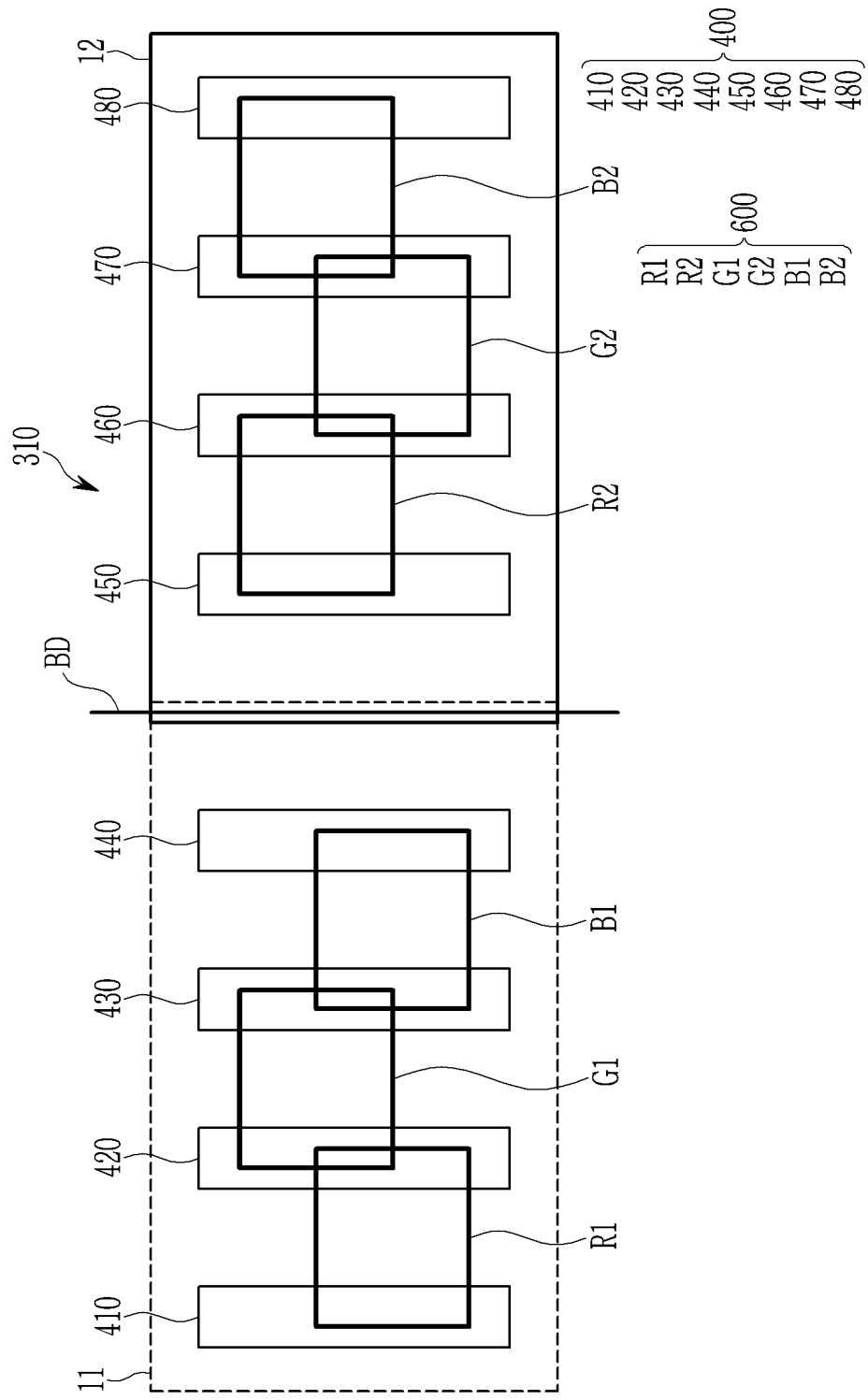
FIG. 6 illustrates an enlarged view of a shape of an inspection pattern of FIG. 5.

Referring to FIG. 6, in the inspection pattern 310, the third color filter B1 and the fourth color filter R2 may be formed apart from each other by a predetermined distance without overlapping each other. Accordingly, the fourth and fifth reference patterns 440 and 450 are separately formed at the right side of the third color filter B1 and at the left side of the fourth color filter R2, respectively.

Hereinafter, an arrangement of the color filters 600 according to the present exemplary embodiment will be described in detail.

The color filters 600 of the inspection pattern 310 according to the present exemplary embodiment are respectively formed at different positions in a longitudinal direction. That is, odd-numbered color filters R1, B1, and G2 from a left side are formed at lower positions than even-numbered color filters G1, R2, and B2 from the left side. This is so that the position of each color filter 600 may be clearly confirmed by preventing the adjacent color filters 600 from being completely overlapped. In some exemplary embodiments, the odd-numbered color filters R1, B1, and G2 from the left side may be formed at higher positions than the even-numbered color filters G1, R2, and B2 from the left side.

Accordingly, the color filters that are disposed in different shots while displaying the same color are formed at different positions in the longitudinal direction. The first color filter R1 may be formed at a relatively lower position in the longitudinal direction compared to the fourth color filter R2. In this case, the second color filter G1 may be formed at a relatively higher position compared to the fifth color filter G2. At the same time, the third color filter B1 may be formed at a relatively lower position compared to the sixth color filter B2. Thus, the plurality of color filters 600 in the inspection pattern 310 are disposed so as to have a two-row-arrangement in up and down directions with overlapping portions.

In addition, the color filters 600 are formed so that predetermined portions thereof overlap each other at portions at which the color filters 600 are adjacent to each other. In this case, a vertical length of an overlapped part between the adjacent color filters 600 is smaller than a vertical length of the color filter 600. However, unlike the inspection pattern 300 of the exemplary embodiment of FIG. 2 and FIG. 3, in the present exemplary embodiment, the third color filter B1 and the fourth color filter R2 are formed apart from each other by a predetermined interval without overlapping each other.

Hereinafter, an arrangement of the reference pattern 400 and a relationship between the color filter 600 and the reference pattern 400 will be described in detail.

In the inspection pattern 310 according to the present exemplary embodiment, the plurality of reference patterns 400 are spaced apart from each other in the row direction at predetermined intervals. In this case, the interval between the fourth reference pattern 440 and the fifth reference pattern 450 may be wider than those between the remaining reference patterns 410, 420, 430, 460, 470, and 480.

In addition, in the present exemplary embodiment, the plurality of color filters 600 are formed between the reference patterns 400, but the color filter 600 is not formed between the fourth reference pattern 440 and the fifth reference pattern 450. Accordingly, the number of reference patterns 400 is two more than that of the plurality of color filters 600. That is, when n color filters 600 are formed, (n+2) reference patterns 400 may be formed. One reference pattern 420, 430, 460, or 470 is formed in an area corresponding to the overlapped part between the color filters 600.

Hereinafter, an order in which the inspection pattern 310 is formed through the divided exposure process will be described.

The inspection pattern 310 according to the present exemplary embodiment includes three color filters R1, G1, and B1 in the area of the shot a, and includes three color filters R2, G2, and B2 in the area of the shot b, and the third and fourth color filters B1 and R2 do not overlap each other. Since the reference pattern 400 overlaps opposite sides of each of the color filters 600, it includes a total of eight reference patterns 410 to 480.

Hereinafter, a method of determining the misalignment of the pattern will be described in detail based on the inspection pattern of FIG. 6 with reference to FIG. 7.

Figure 7:
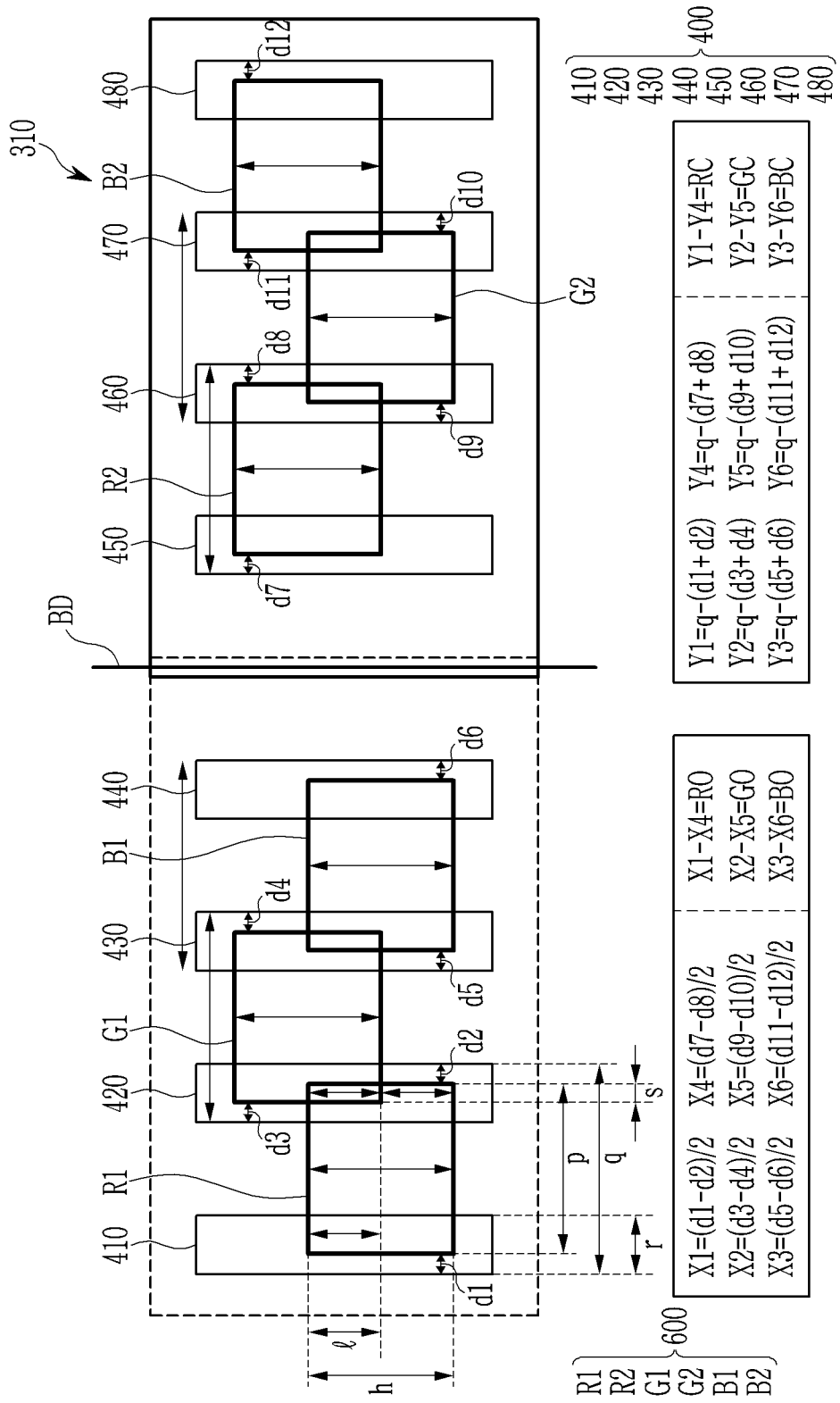
FIG. 7 illustrates a schematic diagram for explaining a shape of an inspection pattern of FIG. 5 or FIG. 6.

Referring to FIG. 7, two parts of the inspection pattern 310 are respectively formed at the shot boundary part BD of the peripheral part 200 to be spaced apart from each other by a predetermined horizontal interval with the shot boundary part BD therebetween. In addition, the inspection pattern 310 is formed with the plurality of color filters 600 and the plurality of reference patterns 410 to 480.

Now, a method of measuring an overlay deviation of the red color filters R1 and R2 through the inspection pattern 310 of the present exemplary embodiment will be described with reference to FIG. 7 and Table 1. The content of the first overlay X1 is the same as that of the above-described exemplary embodiment.

In the present exemplary embodiment, the seventh interval d7 is a distance between the left side of the fourth color filter R2 and the left side of the fifth reference pattern 450 formed at the left side of the red color filter R2. The eighth interval d8 is a distance between the right side of the fourth color filter R2 and the right side of the sixth reference pattern 460 formed at the right side of the fourth color filter R2. Accordingly, the fourth overlay X4, which is the overlay of the fourth color filter R2, is shown in Table 1. Therefore, the first deviation RO is also shown in Table 1.

Now, a method of measuring a line width deviation of the red color filters R1 and R2 through the inspection pattern 310 of the present exemplary embodiment will be described with reference to FIG. 7 and Table 2. For better comprehension and ease of description, the description for the same reference numerals follows the description of the method of measuring the overlay deviation described above. Therefore, the fourth deviation RC is also the same as in Table 2.

It has been exemplarily described that the inspection pattern 310 according to the exemplary embodiment of FIG. 6 and FIG. 7 includes a total of six color filters 600 formed as three on each of the right and left shots, and a total of eight reference patterns 410 to 480 formed at opposite sides of each color filter 600 and overlapping opposite sides of each color filter 600. However, the embodiments are not limited to the number of the color filters 600 and the reference patterns 400.

Figure 8:
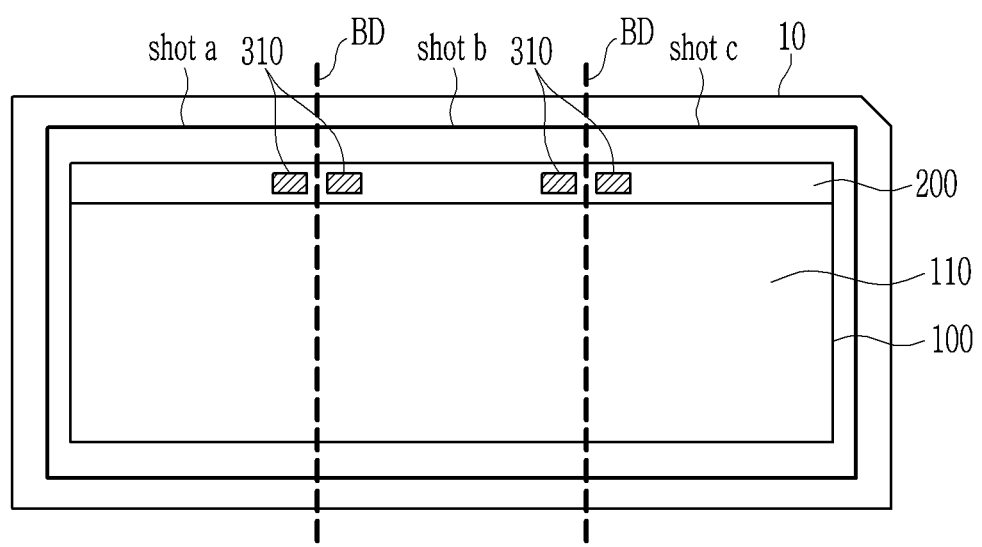
FIG. 8 illustrates a layout view of a display device in which the number of shots is increased as compared to FIG. 5.

FIG. 8 illustrates a layout view of a display device in which the number of shots is increased in FIG. 5, and illustrates an exemplary variation of FIG. 5.

Referring to FIG. 8, the display panel 100 manufactured by three-shot division exposure processes in which the shot a and the shot b shown in FIG. 5 are performed and the shot c is further performed, is shown.

As described in FIG. 5, since the inspection pattern 310 is formed at the shot boundary part BD, the inspection pattern 310 of the display panel 100 manufactured by the three-shot division exposure processes as in the present exemplary embodiment may be formed at two boundary parts BD, which are the boundary part of the shot a and the shot b and the boundary part of the shot b and the shot c. However, in this case, similar to FIG. 5 to FIG. 7, two parts of the inspection pattern 310 according to the present exemplary embodiment are respectively formed at the boundary part BD to be spaced apart from each other by a predetermined horizontal interval with the boundary part BD therebetween without overlapping the boundary part BD.

Hereinafter, the inspection patterns of the display devices according to various exemplary embodiments will be described with reference to FIG. 9, FIG. 10, FIG. 11, and FIG. 12. FIG. 9 to FIG. 12 illustrate a cross-sectional view of a display device according to another exemplary embodiment, respectively.

Figure 9:
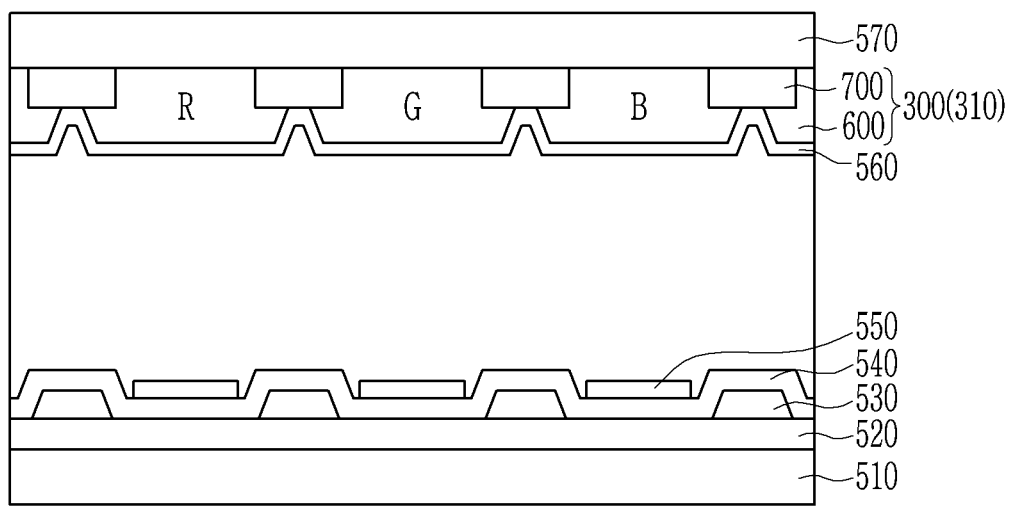
FIGS. 9, 10, 11 and 12 illustrate a cross-sectional view of a display device according to another exemplary embodiment, respectively.

FIG. 9 illustrates an exemplary embodiment in which the inspection pattern is disposed on an upper display panel.

Referring to FIG. 9, a lower display panel may include a lower substrate 510, a gate insulating layer 520, a data wire 530, a passivation layer 540, and a pixel electrode 550. The gate insulating layer 520, the data wire 530, the passivation layer 540, and the pixel electrode 550 are stacked on the lower substrate 510. Although not shown, the pixel electrode 550 is connected to a thin film transistor. The upper display panel may include an upper substrate 570, a light blocking layer 700, a color filter 600, and a common electrode 560. The light blocking layer 700, the color filter 600, and the common electrode 560 are stacked on the upper substrate 570.

In the present exemplary embodiment, the reference pattern 400 is formed with the light blocking layer 700, and the inspection patterns 300 and/or 310 according to the present exemplary embodiment are formed with the color filter layer 600 and the light blocking layer 700.

Figure 10:
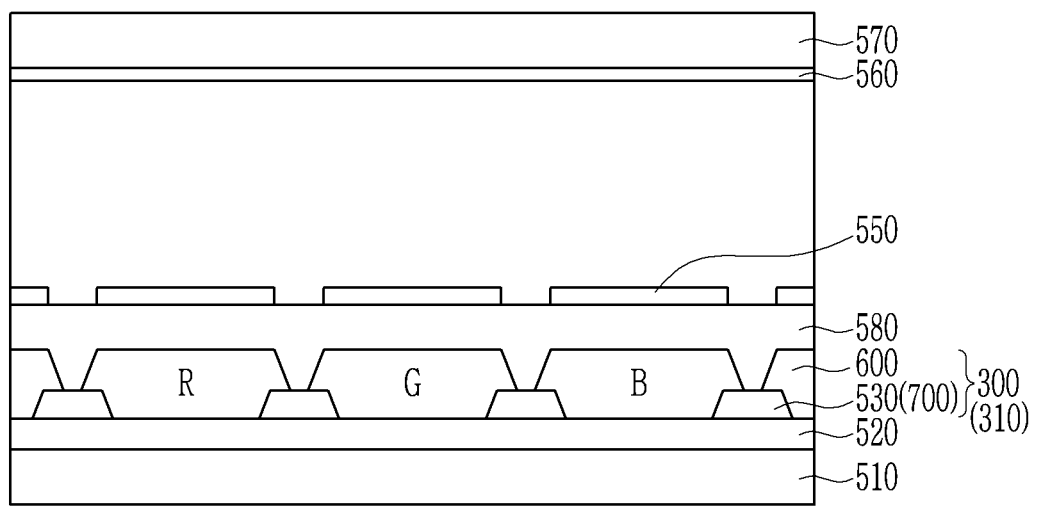

FIG. 10 illustrates an exemplary embodiment in which the inspection pattern is disposed on the lower display panel.

Referring to FIG. 10, the lower display panel may include the lower substrate 510, the gate insulating layer 520, the data wire 530 or the light blocking layer 700, the color filter 600, an organic insulating layer 580, and the pixel electrode 550. The gate insulating layer 520, the data wire 530 or the light blocking layer 700, the color filter 600, the organic insulating layer 580, and the pixel electrode 550 are stacked on the lower substrate 510. Although not shown, the pixel electrode 550 is connected to a thin film transistor. The upper display panel may include the upper substrate 570 and the common electrode 560. The common electrode 560 is stacked on the upper substrate 570. (Color filter On Array; COA structure)

In the present exemplary embodiment, the reference pattern 400 is stacked on the light blocking layer 700 stacked on the lower substrate 510, or on the lower substrate 510, and it may be formed with the data wire 530 made of a metal. That is, the inspection patterns 300 and/or 310 according to the present exemplary embodiment are formed with the color filter layer 600 and the light blocking layer 700, or the color filter layer 600 and the data wire 530.

Figure 11:
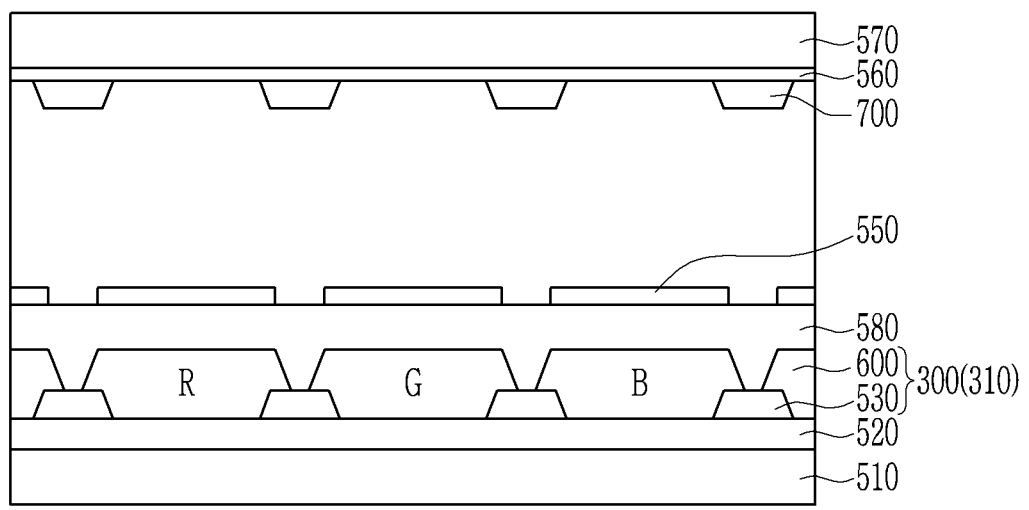

FIG. 11 illustrates another exemplary embodiment in which the inspection pattern is disposed on the lower display panel.

Referring to FIG. 11, the lower display panel may include the lower substrate 510, the gate insulating layer 520, the data wire 530, the color filter 600, the organic insulating layer 580, and the pixel electrode 550. The gate insulating layer 520, the data wire 530, the color filter 600, the organic insulating layer 580, and the pixel electrode 550 are stacked on the lower substrate 510. Although not shown, the pixel electrode 550 is connected to a thin film transistor. The upper display panel may include the upper substrate 570, the common electrode 560, and the light blocking layer 700. The common electrode 560 and the light blocking layer 700 are stacked on the upper substrate 570.

In the present exemplary embodiment, the reference pattern 400 is formed with the data wire 530 made of a metal, and the inspection patterns 300 and/or 310 according to the present exemplary embodiment are formed with the color filter layer 600 and the data wire 530.

Figure 12:
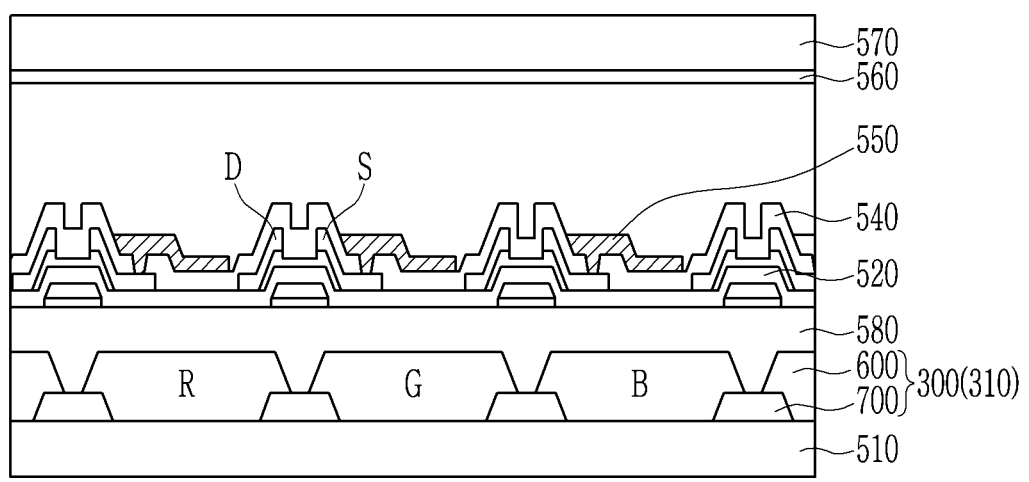

FIG. 12 illustrates another exemplary embodiment in which the inspection pattern is disposed on the lower display panel.

Referring to FIG. 12, the lower display panel may include the lower substrate 510, an array layer in which a thin film transistor (TFT) including a source electrode S and a drain electrode D is included, and the color filter layer 600. The color filter layer 600 and the array layer on the color filter layer 600 are stacked on the lower substrate 510. (Array On Color filter; AOC structure)

In the present exemplary embodiment, the reference pattern 400 is formed with the light blocking layer 700, and the inspection patterns 300 and/or 310 according to the present exemplary embodiment are formed with the color filter layer 600 and the light blocking layer 700.

As described in FIG. 9 to FIG. 12, the reference pattern 400 may be formed with a wire layer made of a metal formed on the same substrate as the color filter 600, or with the light blocking layer 700. In this case, the wire layer made of the metal is not limited to the data wire 530.

Hereinafter, various modifications of the inspection pattern of FIG. 2 will be described with reference to FIG. 13 and FIG. 14. Parts that are different from the exemplary embodiment of FIG. 2 will be described, and parts that are not described follow the exemplary embodiment described above. FIG. 13 and FIG. 14 illustrate a modification from the shape of the inspection pattern of FIG. 2, respectively.

Referring to FIG. 13, an inspection pattern 320 according to the present exemplary embodiment is formed with the plurality of color filters 600 and the plurality of reference patterns 400. In this case, a scale is formed on the plurality of reference patterns 400 included in the inspection pattern 320 according to the present exemplary embodiment. Scales may be formed on one long side and one short side of each reference pattern 411, 421, 431, 441, 451, 461, or 471 at predetermined intervals.

In FIG. 13, the scale is shown as a line having a predetermined length on the reference pattern 400, but when the reference patterns 411, 421, 431, 441, 451, 461, and 471 according to the present exemplary embodiment are formed, the scale may be formed on the reference pattern 400 to have an embossed shape or an engraved shape. That is, the reference patterns 411, 421, 431, 441, 451, 461, and 471 according to the present exemplary embodiment may be metal layers that are easy to process and pattern, and are not limited to the layer of the data wire 530.

In this case, the scale formed on each reference pattern 400 shown in FIG. 13 is merely an example. An interval between and a position of marks of the scale may be appropriately changed according to respective exemplary embodiments so that the measurement of the overlay and line width deviations of the plurality of color filters 600 may be easily performed. For more accurate measurements, the interval between the marks of the scale may be more finely formed.

In the present exemplary embodiment, it is shown that the scale is formed on the left long side of each reference pattern 400, but the scale may be formed on a right long side or both left and right long sides of each reference pattern 400, or may be formed to cross the width of each reference pattern 400. In FIG. 13, the scales are formed on the lower short side of each reference pattern 400, but may be formed on an upper short side or both upper and lower short sides of each reference pattern 400. That is, the embodiments are not limited to the position of the scale formed on each reference pattern 400.

In the inspection pattern 320 according to the present exemplary embodiment, it is possible to easily measure the overlay and line width deviations of the plurality of color filters R1, R2, G1, G2, B1, and B2 by reading the scale that each color filter 600 occupies. When the reference pattern 400 on which the scale is formed and each color filter 600 overlap, or when the color filters 600 overlap each other, it is possible to easily measure a width, a height, etc. by reading the overlapped portion.

In a description of an exemplary embodiment of FIG. 14, parts that are different from the exemplary embodiment of FIG. 13 will be described, and parts that are not described follow the exemplary embodiment described above.

Referring to FIG. 14, an inspection pattern 330 according to the present exemplary embodiment is formed with reference patterns 490 and 491 formed along a side of at least one of the plurality of color filters 600 and the inspection pattern 330 itself. Scales are formed on the reference patterns 490 and 491 included in the inspection pattern 330 according to the present exemplary embodiment as in the exemplary embodiment of FIG. 13.

In the exemplary embodiment FIG. 14, the reference pattern 400 may be formed along one horizontal side and one vertical side of the inspection pattern 330 itself without overlapping the plurality of color filters 600.

In this case, an interval between marks of the scales formed on the reference patterns 490 and 491 and a formation position of the reference patterns 490 and 491 may be appropriately changed according to respective exemplary embodiments so that the measurement of the overlay and line width deviations of the plurality of color filters 600 may be easily performed.

That is, in the present exemplary embodiment, it is shown that each reference pattern 400 is formed on the left vertical side and the lower horizontal side of the inspection pattern 330. However, it may be formed on the right vertical side of the inspection pattern 330 or both left and right vertical sides thereof, and may be formed on the upper horizontal side thereof or both upper and lower horizontal sides thereof. That is, in the inspection pattern 330, the position of the reference pattern 400 on which the scale is indicated does not limit the embodiments.

In the inspection pattern 330 according to the present exemplary embodiment, it is possible to easily measure the overlay and line width deviations of the plurality of color filters R1, R2, G1, G2, B1, and B2 by reading the scale that each color filter 600 overlaps. When the color filters 600 overlap each other, it is possible to easily measure a width, a height, etc. by reading the overlapped portion.

The exemplary embodiment of FIG. 13 and FIG. 14 may be applied not only to the inspection pattern 300 according to the exemplary embodiment of FIG. 2, but also to the inspection pattern 310 according to the exemplary embodiment of FIG. 6.

In order to measure whether the patterns are misaligned, a pattern called a test element group (TEG) is formed on a specific portion of a substrate on which elements are formed or in a separate blank area, and a process is performed on a substrate on which actual elements are formed, and then the corresponding process and characteristics of the elements are evaluated by measuring the TEG.

However, the overlapping of the pattern of the color filter 600 of an active area, which is an area for realizing an actual pixel of the display part 110, may not be accurately measured with the conventional TEG pattern. The patterns of the red, green, and blue color filters are overlapped with each other as they are arranged in a line within the active area, thus the overlapped portions are displayed as dark or black, so that it is difficult to distinguish them, and it is difficult to measure whether the patterns are misaligned in the inspection process. Therefore, it is not easy to correct the overlay and line width deviations of the pattern in the overlapped portion between the color filters, thus it is difficult to improve the stitch defect at the shot boundary part BD.

Accordingly, in the inspection patterns 300, 310, 320, and 330, the patterns of the color filters 600 are arranged in a two-row-arrangement at different positions in the longitudinal direction with overlapping portions (i.e., the first length h>the second length l). The reference pattern 400 is formed on opposite sides of the pattern of the color filter 600 or along the sides of the inspection pattern 330. By measuring the first distance d1 to the twelfth distance d12 between the left and right sides of the color filter 600 and between the left and right sides of the reference pattern 400 disposed at the opposite sides of the color filter 600, or by measuring the portion occupied by each pattern or the overlapped portion with the scale, it is possible to easily obtain the deviation values of the overlay and line width of the color filter 600. Since the deviation of the pattern alignment may be easily corrected through the measured deviation value, the stitch defect may be prevented.

Since the inspection patterns 300, 310, 320, and 330 are disposed within the peripheral part 200 of the display panel 100, which is not the display part 110 thereof, it is possible to prevent an active area including a pixel displaying an image from being damaged. The peripheral part 200 may be a data fan-out part to which the data wire is connected. That is, the inspection patterns 300, 310, 320, and 330 may be disposed to be adjacent to the data fan-out part where the wire connected to the data line from a driving integrated chip (IC) is disposed.

In addition, since the inspection patterns 300, 310, 320, and 330 are disposed at the shot boundary part BD of at least one existing in the peripheral part 200, it is possible to prevent the stitch defect occurring at the boundary part BD from being viewed on the display panel 100.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

DESCRIPTION OF SYMBOLS

| | |
|---|---|
| 10: mother substrate | 100: display panel |
| 110: display part | 200: peripheral part |
| 300, 310: inspection pattern | 400: reference pattern |
| 600: color filter | |
| 510: lower substrate | 520: gate insulating layer |
| 530: data wire | 540: passivation layer |
| 550: pixel electrode | 560: common electrode |
| 570: upper substrate | 580: organic insulating layer |
| 700: light blocking layer | |

What is claimed is:

1. A display device comprising:
    a display part configured to include a display part color filter; and
    a peripheral part disposed at a side of the display part and including an inspection pattern for checking an alignment of the display part color filter,
    wherein the inspection pattern includes a plurality of color filters having colors and reference patterns disposed at least on one side of the plurality of color filters, a number of the plurality of color filters of each color corresponds to a number of shots of a division exposure process,
    a second color filter is substantially adjacent to a first color filter in a first direction, a third color filter is substantially adjacent to the second color filter in the first direction, a fourth color filter is substantially adjacent to the third color filter in the first direction, a fifth color filter is substantially adjacent to the fourth color filter in the first direction, a sixth color filter is substantially adjacent to the fifth color filter in the first direction,
    the second color filter partly overlaps the first color filter, the third color filter partly overlaps the second color filter, the fourth color filter partly overlaps the third color filter, the fifth color filter partly overlaps the fourth color filter, the sixth color filter partly overlaps the second color filter,
    the first, third, and fifth color filters are odd-numbered color filters,
    the second, fourth, and sixth color filters are even-numbered color filters,
    the odd-numbered color filters are disposed at a first position in a second direction which is at a right angle to the first direction,
    the even-numbered color filters among the plurality of color filters are disposed at a second position in the second direction,
    the first position is different from the second position.

2. The display device of claim 1, wherein:
    the inspection pattern is disposed at a boundary part of the shots existing in at least one peripheral part.

3. The display device of claim 1, wherein:
    an interval between the plurality of color filters is the same as an interval between the display part color filter.

4. The display device of claim 1, wherein:
    an interval between the reference patterns is the same as an interval between reference patterns disposed in the display part.

5. The display device of claim 2, wherein: the inspection pattern is disposed at the boundary part of the shots, and one of the reference patterns and at least one of the color filters are adjacent to the boundary part of the shots.

6. The display device of claim 5, wherein:
    the reference patterns are spaced apart in a row direction at predetermined intervals.

7. The display device of claim 5, wherein:
    a scale in which marks are disposed at predetermined intervals is disposed on the reference patterns along at least one side of the reference patterns.

8. The display device of claim 2, wherein: the inspection pattern includes two separated inspection patterns, and the reference patterns closest to the boundary part of the shots among the two separated inspection patterns is disposed to have a predetermined horizontal distance from the boundary part of the shots.

9. The display device of claim 8, wherein:
    the reference patterns are spaced apart in a row direction at predetermined intervals, and an interval between the reference patterns closest to the boundary part of the shots among the predetermined intervals is different from the remaining predetermined intervals.

10. The display device of claim 8, wherein:
    a scale with predetermined interval marks is disposed on the reference patterns along at least one side of the reference patterns.

11. The display device of claim 1, wherein:
    the reference patterns are disposed along at least one side of the inspection pattern, and a scale with predetermined interval marks is disposed on the reference patterns.

12. The display device of claim 1, wherein:
a color filter of the plurality of color filters partially overlaps another color filter of the plurality of color filters adjacent thereto, and
a vertical length of an overlapped portion of the adjacent color filters is smaller than a vertical length of the plurality of color filters.

13. The display device of claim 1, wherein:
the reference patterns have a shape of a pad having a predetermined horizontal length and a predetermined vertical length, and
the vertical length of the reference patterns is longer than a vertical length of the plurality of color filters.

14. The display device of claim 1, wherein:
the plurality of color filters of the inspection pattern are disposed on an upper substrate,
a light blocking layer is disposed on the upper substrate, and
the reference patterns are made of the same material as the light blocking layer.

15. The display device of claim 1, wherein:
the plurality of color filters of the inspection pattern are disposed on a lower substrate,
a light blocking layer is disposed on the lower substrate, and
the reference patterns are made of the same material as the light blocking layer or a data wire disposed on the lower substrate.

16. The display device of claim 1, wherein:
the plurality of color filters of the inspection pattern are disposed on a lower substrate,
a light blocking layer is disposed on an upper substrate, and
the reference patterns are made of the same material as a data wire disposed on the lower substrate.

17. The display device of claim 1, wherein:
the plurality of color filters of the inspection pattern are disposed on a lower substrate,
a light blocking layer is disposed on a lower substrate,
an array layer in which a thin film transistor is included is stacked on the plurality of color filters, and
the reference patterns are made of the same material as the light blocking layer.

18. The display device of claim 1, wherein the first position is a higher position than the second position in the second direction.

19. The display device of claim 1, wherein the first position is a lower position than the second position in the second direction.

* * * * *